(12) United States Patent
Huber

(10) Patent No.: US 6,494,637 B2
(45) Date of Patent: Dec. 17, 2002

(54) APPARATUS HAVING A DISC-SHAPED COMPONENT SUPPORT FORCE-COUPLED TO A DRIVE SHAFT

(75) Inventor: Alois Huber, Vienna (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/817,101

(22) Filed: Mar. 26, 2001

(65) Prior Publication Data

US 2001/0031173 A1 Oct. 18, 2001

(30) Foreign Application Priority Data

Mar. 27, 2000 (EP) ............................. 00890100

(51) Int. Cl.[7] ............................ G11B 5/53; G11B 25/06; G11B 33/08; G11B 15/61
(52) U.S. Cl. ........................................ 403/271; 403/375
(58) Field of Search ............................ 403/1, 271, 273, 403/345, 375

(56) References Cited

U.S. PATENT DOCUMENTS

| 4,464,690 A | | 8/1984 | Hanecka et al. ............... 360/84 |
| 4,594,623 A | * | 6/1986 | Hutter ..................... 403/373 X |

FOREIGN PATENT DOCUMENTS

| EP | 0349430 A2 | 1/1990 |
| EP | 0494640 A2 | 7/1992 |

* cited by examiner

*Primary Examiner*—Christopher J. Novosad

(57) ABSTRACT

In an apparatus (1) having a drive shaft (18) and having a disc-shaped support (17) which is rotationally locked to the drive shaft (18) the support (17) has two tubular projections (22, 23) each having a connecting zone (24, 25) in its interior, which connecting zone has a given height (H1, H2) and a given inner diameter (D1, D2), each of the two projections (22, 23) being connected to the drive shaft (18) by a press-fit in the area of its connecting zone (24, 25), and the two inner diameters (D1, D2) of the two connecting zones (24, 25) having different values.

6 Claims, 2 Drawing Sheets

APPARATUS HAVING A DISC-SHAPED COMPONENT SUPPORT FORCE-COUPLED TO A DRIVE SHAFT

The invention relates to an apparatus as defined in the opening part of claim 1.

Such an apparatus is known from the patent document U.S. Pat. No. 4,464,690, which apparatus is a so-called video recorder. In the known apparatus a clamping device is arranged in the area of each of the two tubular projections of the support, which clamping device is mounted on the relevant projection and, after it has been mounted onto the relevant potion, it is made to exert its clamping action by actuation of an adjustment screw. This construction is comparatively expensive and complicated and requires comparatively much effort in order to obtain the desired clamping action and, consequently, the desired force-coupling and locking of the projections and thus the support to the drive shaft. Furthermore, the known apparatus has the problem that the clamping forces which act in the areas of the two projections are tolerance dependent to a comparatively large extent, as a result of which the situation may arise that in the areas of the two projections, which are axially spaced apart, substantially equal clamping forces are produced, which is not favorable because it has been found that, for a correct and precise clamping of a disc-shaped support onto a drive shaft with the aid of two spaced-apart tubular projections, it is advantageous if the clamping forces in the area of the one projection and the clamping forces in the area of the other projection differ from one another by an as accurate as possible nominal amount, which guarantees that a so-called main clamping point and, in addition, a stabilization clamping point are obtained.

It is an object of the invention to improve an apparatus of the type defined in the opening part of claim 1 and to couple a disc-shaped support to a drive shaft in an improved and highly precise manner using simple means.

According to the invention, in order to achieve the aforementioned object, an apparatus as defined in the opening part of claim 1 in addition has the characteristic features defined in the characterizing part of claim 1.

The construction in accordance with the invention guarantees a very precise and stable non-aging fastening of a support for a component to a drive shaft for driving the support together with the component, the desired result being obtained with a simple construction and without any separate clamping elements. By means of the measures in accordance with the invention it is achieved that as a result of the difference between the two inner diameters of the two connecting zones, which difference can be controlled very accurately, the clamping forces that occur in the areas of the two connecting zones can be given accurately defined different magnitudes, as a result of which a main clamping point and a stabilization clamping point are obtained in a highly reliable manner.

In an apparatus in accordance with the invention it has proved to be very advantageous when, in addition, the characteristic features defined in claim 2 and in claim 3 are provided. After extensive testing these constructions have proved to be advantageous in view of a maximal precision in conjunction with a production at reasonable cost.

In an apparatus in accordance with the invention it has further proved to be very advantageous when, in addition, the characteristic features defined in claim 4 are provided. This construction is advantageous in view of a clear definition of the main clamping point and the stabilization clamping point.

The above-mentioned as well as further aspects of the invention will become apparent from the embodiment described hereinafter by way of example and will be elucidated with reference to this example.

The invention will now be described in more detail with reference to the drawings, which show an embodiment which is given by way of example but to which the invention is not limited.

Figure 1:
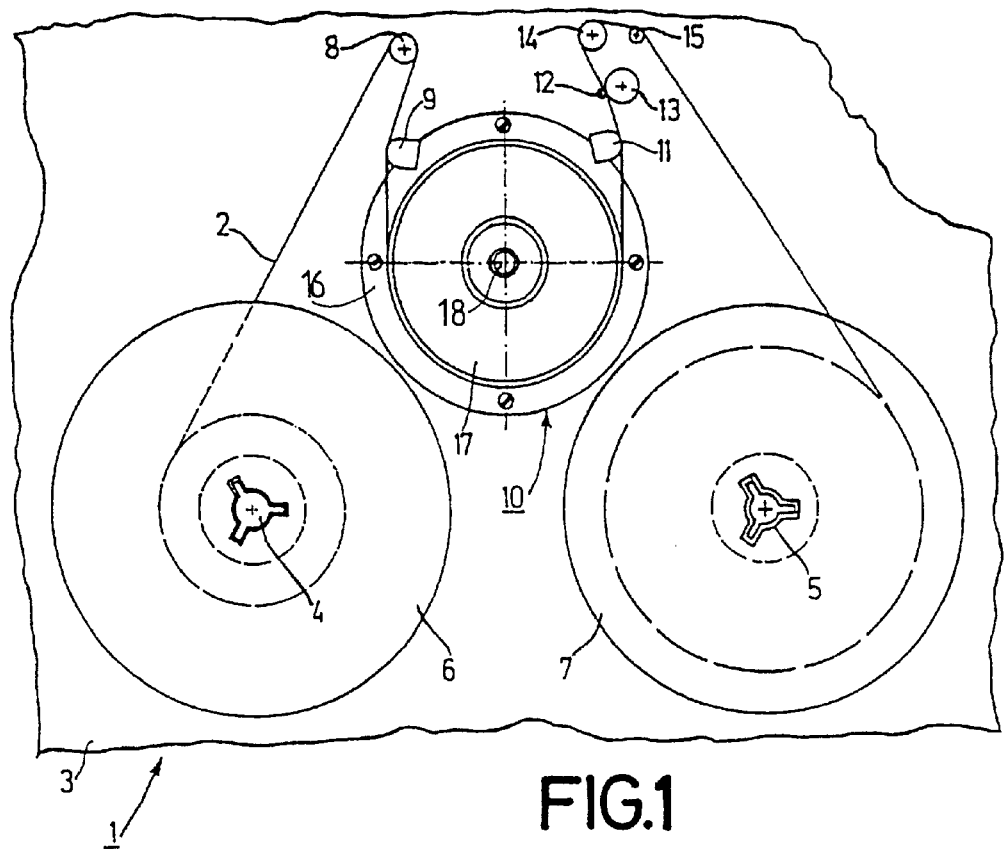
FIG. 1 is a diagrammatic plan view of a part of a recording and reproducing apparatus including a drum-shaped scanning device, which has a disc-shaped support for carrying magnetic heads.

FIG. 1 shows diagrammatically a part of a recording and reproducing apparatus 1 for recording and reproducing picture and sound information on/from a magnetic tape 2. Hereinafter, the recording and reproducing apparatus 1 will be referred to briefly as the apparatus 1.

The apparatus 1 has a substantially plate-shaped chassis 3, which carries a supply mandrel 4 and a take-up mandrel 5, which two winding mandrels 4 and 5 serve to drive a supply reel 6 and a take-up reel 7, respectively, which reels 6 and 7 are placed onto the respective winding mandrel 4 or 5. In its path from the supply reel 6 to the take-up reel 7 the magnetic tape 2 is guided past several parts, namely past a tape guide pin 8 for redirecting the magnetic tape 2 and past a magnetic erase head 9 for erasing any information stored on the magnetic tape 2 and past a so-called tape guide drum 10 and past a magnetic recording and reproducing head 11 for recording and reproducing sound information on the magnetic tape 2 and from the magnetic tape 2 and via a capstan 12 which serves to cooperate with a pressure roller 13, which can be urged against the capstan 12 in a manner not shown, in order to move the magnetic tape 2 uniformly during a recording and reproducing process, and past two further tape guide pins 14 and 15 for redirecting the magnetic tape 2. It is obvious that the supply reel 6 and the take-up reel 7 may be accommodated in a magnetic-tape cassette, in which case the magnetic tape 2 can be fed out of the magnetic-tape cassette in a corresponding direction and can be led past the aforementioned parts of the device 1.

The tape guide drum 10, as is common practice, consists of a stationary lower drum section 16 and a rotationally drivable upper drum section 17. The upper drum section 17 is force-coupled to a drive shaft 18. In a manner not shown, the drive shaft 18 can be driven by means of a motor secured to the chassis 3. The upper drum section 17 carries a plurality of magnetic heads, not shown in the Figures, which are rotationally drivable with the aid of the upper drum section 17 and by means of which the magnetic tape 2 can be scanned along tracks which are inclined with respect to the longitudinal direction of the magnetic tape 2, which is because the magnetic tape 2 is wrapped around the tape guide drum 10 along a helical path. Thus, the rotationally drivable drum section 17 forms a disc-shaped support for carrying at least one component part, namely for carrying the aforementioned magnetic heads. Hereinafter, the rotationally drivable upper drum section is briefly referred to as the support 17.

Figure 2:
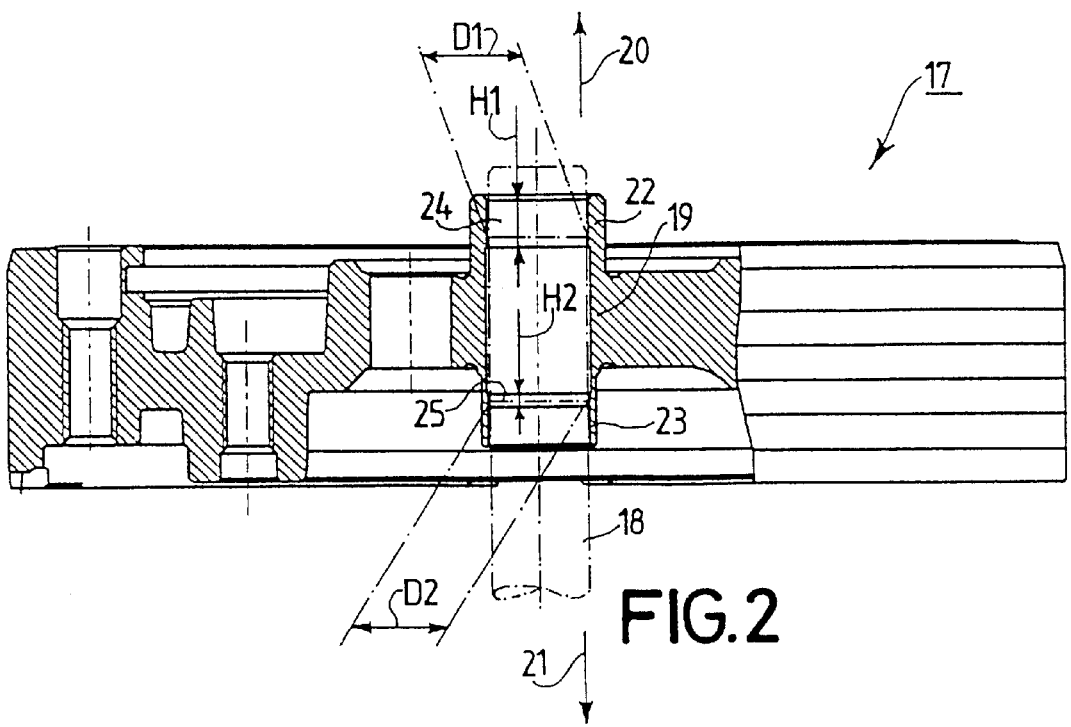
FIG. 2 shows the disc-shaped support of the recording and reproducing apparatus shown in FIG. 1.

The disc-shaped support 17 is shown in detail in FIG. 2. With regard to the disc-shaped support 17 it is to be noted in the present context that the support 17 has a hub portion 19 and two tubular projections 22 and 23 which are coaxial with the drive shaft 18, which for the clarity of the drawing is shown only in dash-dot lines in FIG. 2, and which project from the hub portion 19 in opposite axial directions 20 and 21, which are each indicated by an arrow in FIG. 2. The support 17 is force-coupled to the drive shaft 18 with the aid of the two projections 22 and 23.

For this purpose, the support 17 has the advantageous feature that a connecting zone 24 or 25, respectively, has been provided in the interior of each of the two projections 22 and 23. The first connecting zone 24 in the interior of the first projection 22 has a dimension H1 in the axial direction and has an inner diameter D1. The second connecting zone 25 in the interior of the second projection 23 has a dimension H2 in the axial direction and has an inner diameter D2.

Each of the two projections 22 and 23 of the support 17 is connected to the drive shaft 18 by a press-fit in the area of its respective connecting zone 24 or 25. In a particularly advantageous manner, different values have been selected for the two inner diameters D1 and D2 of the connecting zones 24 and 25. The diameters have been proportioned in such a way that the difference between the two inner diameters D1 and D2 of the two connecting zones 24 and 25 lies in a range between 0.05% and 0.3% of the values of the two inner diameters D1 and D2, the difference between the two inner diameters D1 and D2 of the two connecting zones 24 and 25 being in the range of 0.1% of the values of the two inner diameters D1 and D2 in the present specific case of the support 17 shown in FIG. 2. For the support 17 the dimensions H1 and H2 and the diameters D1 and D2 have been selected in such a manner that the dimension H1 in the axial direction of the connecting zone 24 having the smaller inner diameter D1 is greater than the dimension H2 in the axial direction of the connecting zone 25 having the larger inner diameter D2.

Figure 3:
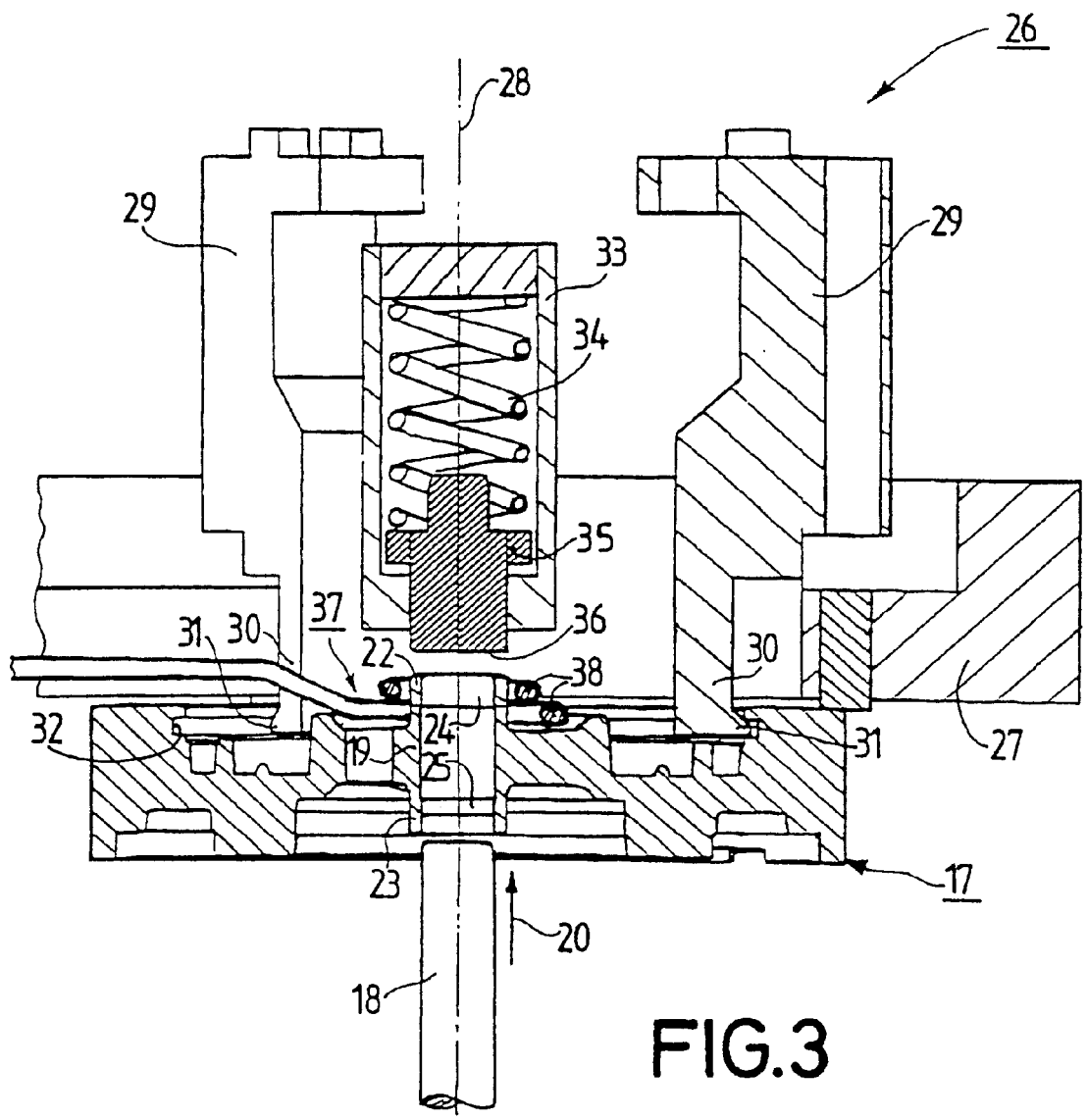
FIG. 3 is a diagrammatic cross-sectional view of a device for coupling the disc-shaped support shown in FIG. 2 to a drive shaft for driving the disc-shaped support.

Hereinafter, a device 26 for making a force-coupling between the support 17 and the drive shaft 18 is described in greater detail with reference to FIG. 3. In order to form a press-fit between each of the two connecting zones 24 and 25 of the support 17 and the drive shaft 18 the support 17 is placed in the device 26. The device 26 has a chassis 27. The chassis 27 carries a total of three holders 29 which are each arranged so as to be movable in a radial direction with respect to a central axis 28 and of which only two holders 29 are visible in FIG. 3. At their ends 30 which face the support 17 the holders 29 each have a nose 31, with which the holders 29 engage in a circular retaining groove 32 of the support 17. Thus, the support 17 is retained and positioned accurately both axially and radially. The device 26 further has a cage 33, which accommodates a pressure spring 34 and a plunger 35, which extends through the cage 33 at the bottom and whose free bounding surface 36 serves to and is adapted to cooperate with the drive shaft 18. The device 26 further includes a heating arrangement 37, which is shown only diagrammatically in FIG. 3 and which operates in accordance with the induction principle and has a heater winding 38 arranged in such a manner in the device 26 that after the support 17 has been placed into the device 26 the heater winding 38 surrounds the first projection 22 of the support 17 with its circular turns.

In order to form the connection between the support 17 and the drive shaft 18 the heating arrangement 37 is activated for a duration of approximately 2 to 5 seconds, during which a high frequency current having a frequency in the range of approximately 100 to 300 kHz flows through the turns of the heater winding 38, which results in inductive warming up or heating of the support 17 in the area of its first tubular projection 22 and its hub portion 19 as well as in the area of its second tubular projection 23. This results in an increase in diameter of the two projections 22 and 23. After an adequate heating and consequent expansion of the support 17 in the areas of its two connecting zones 24 and 25 the drive shaft 18 and the support 17 are moved towards one another parallel to the axial directions 20 and 21 until the free end of the drive shaft 18 abuts against the bounding surface 36 of the plunger 35. As a result of the aforementioned heating and expansion of the support 17 the drive shaft 18 can readily be passed through the support 18, i.e. without the support 17 being subjected to any undesired deformation or the support 17 being loaded by any forces. The heating arrangement is already deactivated when passing of the drive shaft 18 through the support begins, which precludes an undesired heating and expansion of the drive shaft 18 and which results in a subsequent cooling of the support 18 in the areas of its two projections 22 and 23. This then leads to a contraction of the support 17 in the areas of the two projections 22 and 23, as a result of which a press-fit is obtained in the connecting zone 24 and in the connecting zone 25 between the respective projection 22 or 23 and the drive shaft 18.

The support 17 shown in FIG. 2 has a nominal outer diameter of 62.0 mm. The shaft has a nominal outer diameter of 6.0 mm. The dimension H1 in the axial direction, i.e. the height H1 of the first connecting zone 24 has a value of approximately 2.7 mm. The height H2 of the second connecting zone 25 has a value of approximately 0.8 mm. For the support 17 the nominal value selected for the inner diameter D1 is 5.986 mm and the nominal value selected for the inner diameter D2 is 5.992 mm. The nominal diameter difference between the two inner diameters D1 and D2 is consequently nominally 6.0 $\mu$m, that means approximately 0.1% of the values of the two inner diameters D1 and D2, which are slightly smaller than 6.0 mm, i.e. 5.986 mm and 5.992 mm.

The inner diameter of the hub portion 19 between the two connecting zones 24 and 25 is selected to be greater than 6.0 mm. The inner diameter in the interior of the second tubular projection 23 between the second connecting zone 25 and the free end of the second projection 23 is also selected to be greater than 6.0 mm, this inner diameter having a nominal value of for example 6.005 mm. Thus, in the area of its free end the second projection 23 facilitates the entry of the drive shaft 18 when it is passed through the support 17.

Owing to the construction of the support 17 described hereinbefore it is achieved in a simple manner that the support 17 is force-coupled to the shaft 18 with the aid of a main clamping zone and with the aid of a stabilization clamping zone, the main clamping zone being situated in the area of the connecting zone 24 and the stabilization clamping zone being situated in the area of the connecting zone 25.

The use of the invention is not limited to a recording and reproducing apparatus but is also possible with advantage in other apparatuses having a support for at least one component part, which support is force-coupled to a drive shaft.

What is claimed is:

1. An apparatus (1) having a drive shaft (18) with an end and a shaft diameter, and having a disc-shaped support (17) which is rotationally locked to the drive shaft (18), for carrying at least one component part, which support (17) has a hub portion (19) and two tubular projections (22,23) which are coaxial with the drive shaft (18) and which project from the hub portion (19) in opposite axial directions (22,21), and which support (17) is force-coupled to the drive shaft (18) with the aid of the two projections (22,23), characterized in that an annular connecting zone (24,25) has been provided in the interior of each of the two projections (22,23), which annular connecting zone has a given dimension (H1,H2) in the axial direction and has a given inner diameter (D1,D2), and each of the two projections (22,23) is connected to the drive shaft (18) by a press-fit in the area of its annular connecting zone (24,25), and the two inner diameters (D1, D2) of the two annular connecting zones (24,25) have different values that are less than said shaft diameter, and diameter (D1) being adjacent said end and being smaller than diameter (D2).

2. An apparatus (1) as claimed in claim 1, characterized in that the difference between the two inner diameters (D1, D2) of the two connecting zones (24, 25) lies in a range between 0.05% and 0.3% of the values of the two inner diameters (D1, D2).

3. An apparatus (1) as claimed in claim 2, characterized in that the difference between the two inner diameters (D1, D2) of the two connecting zones (24, 25) lies in the range of 0.1% of the values of the two inner diameters (D1, D2).

4. An apparatus (1) as claimed in claim 1, characterized in that the dimension (H1) in the axial direction of the connecting zone (24) having the smaller inner diameter (D1) is greater than the dimension (H2) in the axial direction of the connecting zone (25) having the larger inner diameter (D2).

5. An apparatus comprising a drive shaft having an end and a shaft diameter;

a component carrying hub press fit attached to said shaft at two annular connection zones separated by a region having a diameter greater than said shaft diameter, and one of said two annular connection zones, which is adjacent said end, having a smaller diameter than a diameter of the other annular connection zone, which is smaller than said shaft diameter; and said two annular connection zones being portions of respective tubular projections which project in opposite directions from a hub portion.

6. The apparatus of claim 5 wherein said two annular connection zones have respective uniform diameters over respective length dimensions in an axial direction defined by said drive shaft.

* * * * *